(12) United States Patent
Semmelroth et al.

(10) Patent No.: US 7,669,786 B2
(45) Date of Patent: Mar. 2, 2010

(54) WINDSHIELD WASHER DEVICE

(75) Inventors: Holger Semmelroth, Eschwege (DE); Heiko Weitzel, Schenklengsfeld-Hilmes (DE)

(73) Assignee: Siemens Aktiengesellschaft, Munich (DE)

( * ) Notice: Subject to any disclaimer, the term of this patent is extended or adjusted under 35 U.S.C. 154(b) by 45 days.

(21) Appl. No.: 11/574,028

(22) PCT Filed: Jun. 8, 2006

(86) PCT No.: PCT/EP2006/063026
§ 371 (c)(1),
(2), (4) Date: Feb. 21, 2007

(87) PCT Pub. No.: WO2006/131549
PCT Pub. Date: Dec. 14, 2006

(65) Prior Publication Data
US 2009/0032616 A1    Feb. 5, 2009

(30) Foreign Application Priority Data
Jun. 10, 2005    (DE) ..................... 10 2005 027 004

(51) Int. Cl.
*B05B 1/10* (2006.01)
(52) U.S. Cl. .................................. 239/284.1; 239/284.2
(58) Field of Classification Search .............. 239/284.1, 239/284.2; 15/250.001–250.003, 250.01–250.05
See application file for complete search history.

(56) References Cited

U.S. PATENT DOCUMENTS

| | | | | |
|---|---|---|---|---|
| 1,733,521 A | * | 10/1929 | Wuesthoff | 285/68 |
| 3,213,493 A | * | 10/1965 | Chichester | 239/284.1 |
| 3,719,819 A | * | 3/1973 | Lowell | 239/284.2 |
| 5,769,323 A | * | 6/1998 | Hartick et al. | 239/284.2 |
| 5,957,385 A | * | 9/1999 | Suhring et al. | 239/284.1 |
| 6,019,292 A | * | 2/2000 | Walther | 239/284.1 |
| 6,050,503 A | * | 4/2000 | Suhring et al. | 239/284.1 |
| 6,247,652 B1 | * | 6/2001 | Stange et al. | 239/284.1 |

(Continued)

FOREIGN PATENT DOCUMENTS

| | | |
|---|---|---|
| DE | 4305245 A1 | 8/1994 |
| DE | 19641460 A1 | 4/1998 |
| DE | 19652083 A1 | 6/1998 |

OTHER PUBLICATIONS

Written Opinion of International Search Report, PCT/EP2006/063026, 2 pages.
International Search Report PCT/EP2006/063026, 4 pages, Jul. 28, 2006.

*Primary Examiner*—Dinh Q Nguyen
*Assistant Examiner*—Justin Jonaitis
(74) *Attorney, Agent, or Firm*—King & Spalding L.L.P.

(57) ABSTRACT

In the case of a windshield washer device (2) for a motor vehicle, a nozzle holder (6) is connected via a spring element (12) to a fastening flange (4) fastened to the motor vehicle. The nozzle holder (6) has a connection (9) for a washer fluid line (10). The spring element (12) is formed as a cross-sectional tapering (15) of a connecting element (14). The angle of inclination of the nozzle holder (6) and therefore the angle of inclination of a washer nozzle (7) arranged in the nozzle holder (6) can be adjusted via an adjusting means (13) at a distance from the spring element (12).

20 Claims, 6 Drawing Sheets

U.S. PATENT DOCUMENTS

| | | | |
|---|---|---|---|
| 6,530,533 B1 | 3/2003 | Halek | 239/284.1 |
| 6,769,630 B1 * | 8/2004 | Leipziger | 239/284.1 |
| 6,854,666 B2 * | 2/2005 | Jenkins | 239/284.2 |
| 7,036,749 B1 * | 5/2006 | Steerman | 239/284.1 |
| 7,311,268 B2 * | 12/2007 | Sporer et al. | 239/128 |
| 2006/0243823 A1 * | 11/2006 | Bachmann et al. | 239/284.1 |

* cited by examiner

WINDSHIELD WASHER DEVICE

CROSS-REFERENCE TO RELATED APPLICATIONS

This application is a U.S. national stage application of International Application No. PCT/EP2006/063026 filed Jun. 8, 2006, which designates the United States of America, and claims priority to German application number DE 10 2005 027 004.2 filed Jun. 10, 2005, the contents of which are hereby incorporated by reference in their entirety.

TECHNICAL FIELD

The invention relates to a windshield washer device for a windshield washer system, with a fastening flange provided for fastening in a motor vehicle, with a nozzle holder having two sections, wherein a washer nozzle is arranged on one section of the nozzle piece and a connection for a washer fluid line is arranged in the second section of the nozzle piece, and with an adjusting means, which has an adjustable adjusting element, for adjustment of the angle of inclination of the washer nozzle.

BACKGROUND

Windshield washer devices of this type are frequently used in motor vehicles today and are known, for example, from DE 196 52 083 A1. In the case of this windshield washer device, the adjusting means is formed as an eccentric, which is mounted in the fastening flange, and is supported on a body part of the motor vehicle. A spring tongue of the fastening flange is supported on that side of the body part which lies opposite the eccentric. The nozzle holder and the fastening flange are connected rigidly to each other, which has the result that, during the adjustment of the angle of inclination of the washer nozzle, the fastening flange is adjusted in relation to the body part. The fastening flange therefore does not reliably bear against the body part, and therefore operating forces have to be supported by the spring tongue.

Furthermore, a windshield washer device is known from practice, in which an elastic element is arranged between the fastening flange and the nozzle holder. The windshield washer device is therefore very complicated to manufacture. In addition, the connection for the washer fluid line is arranged on the fastening flange, and therefore a washer fluid channel leading to the washer nozzle has to be guided by the elastic element. Since, because of this, the elastic element has very large dimensions, this configuration leads to a multi-piece manufacturing of the fastening flange and of the elastic element. While the connection for the washer fluid line needs to be highly stable, the elastic element, with at least the same dimensions, has to be elastomeric in order to make it possible for the angle of inclination of the washer nozzle to be adjustable.

SUMMARY

The invention is based on the problem of developing a windshield washer device of the type mentioned at the beginning in such a manner that it permits secure fastening in the motor vehicle and is constructed particularly cost-effectively.

This problem is solved according to the invention in that the adjusting means is coupled directly to the nozzle holder and the fastening flange, and in that the nozzle holder, which has the connection for the washer fluid line and the washer nozzle, is connected to the fastening flange via a spring element.

Thus, according to an embodiment a windshield washer device for a windshield washer system, may comprise a fastening flange provided for fastening in a motor vehicle, a nozzle holder having two sections, wherein a washer nozzle is arranged on one section of the nozzle holder and a connection for a washer fluid line is arranged in the second section of the nozzle holder, and an adjusting means, which has an adjustable adjusting element, for adjustment of the angle of inclination of the washer nozzle, wherein the adjusting means is coupled directly to the nozzle holder and the fastening flange, and wherein the nozzle holder, which has the connection for the washer fluid line and the washer nozzle, is connected to the fastening flange via a spring element.

BRIEF DESCRIPTION OF THE DRAWINGS

The invention permits numerous embodiments. To further clarify its basic principle, a plurality of embodiments are illustrated in the drawing and are described below. In the drawing.

DETAILED DESCRIPTION

This configuration makes it possible to connect the fastening flange immovably to a body part of the motor vehicle. According to an embodiment, an adjustment of the angle of inclination does not lead to an adjustment of the fastening flange in relation to the body sheet. This makes the windshield washer device according to an embodiment particularly highly stable. According to an embodiment, the nozzle holder is connected to the fastening flange both via the spring element and also via the adjusting means. The nozzle holder is therefore reliably held in its set position. Since the washer fluid channel between the connection of the washer fluid line and the washer nozzle is guided exclusively through the nozzle holder, according to an embodiment, the windshield washer device can be manufactured particularly cost-effectively.

The manufacturing costs of the windshield washer device are further reduced if the spring element is manufactured from the same material as the fastening flange and the nozzle holder according to an embodiment.

The manufacturing costs of the windshield washer device are further reduced if the nozzle holder, the fastening flange and the spring element are manufactured as a single piece from plastic by injection molding according to an embodiment.

According to another embodiment, the spring element turns out to be particularly simple structurally if the nozzle holder and the fastening flange are connected to each other via a connecting element, and if the spring element is formed as a cross-sectional tapering of the connecting element.

The windshield washer device is fastened particularly securely in the motor vehicle if the fastening flange is manufactured as a single piece with latching elements for interlocking and immovable fastening to the motor vehicle according to an embodiment. Furthermore, the installation of the windshield washer device according to an embodiment turns out to be particularly simple as a result.

According to another embodiment, it can be avoided subjecting the adjusting means to a bending stress if the adjusting means has a joint arranged on the fastening flange or the nozzle holder.

The outlay for adjusting the angle of inclination of the washer nozzle can be kept particularly low, according to another embodiment, if the adjusting means has a connecting element, which is arranged on the fastening flange or the nozzle holder, for supporting the adjusting element which is mounted on the respectively opposite component of the fastening flange or of the nozzle holder.

The stability of the windshield washer device according to an embodiment is further increased if a ring element, which is connected to the fastening flange and the nozzle holder and is configured elastically, or deformable adjusting connecting elements is or are arranged at a distance from the spring element. By this means, the nozzle holder is supported with the spring element and the ring element or the adjusting connecting elements at two locations on the fastening flange.

The adjustment of the angle of inclination of the washer nozzle is further, simplified, according to another embodiment, if the adjusting element is formed as a screw. The screw is preferably formed as a threaded pin.

According to another embodiment, a further, particularly simple adjustment of the angle of inclination of the washer nozzle consists in that the adjusting element is formed as an eccentric.

According to another embodiment, the adjusting element turns out to be particularly simple structurally if the adjusting element is arranged in the ring element and has a noncircular cross section. The adjusting element arranged in the ring element preferably has an oval cross section according to an embodiment. Rotation of the noncircular adjusting element, which is arranged in the ring element, makes it possible to adjust the position of the nozzle holder in relation to the fastening flange. An additional mounting of the adjusting element, according to an embodiment, as in the case of the eccentric, is not required here.

A particularly convenient adjustment of the nozzle holder can be achieved in a simple manner, according to another embodiment, if the nozzle holder has an opening for the passage of a tool to the adjusting element.

Figure 1:
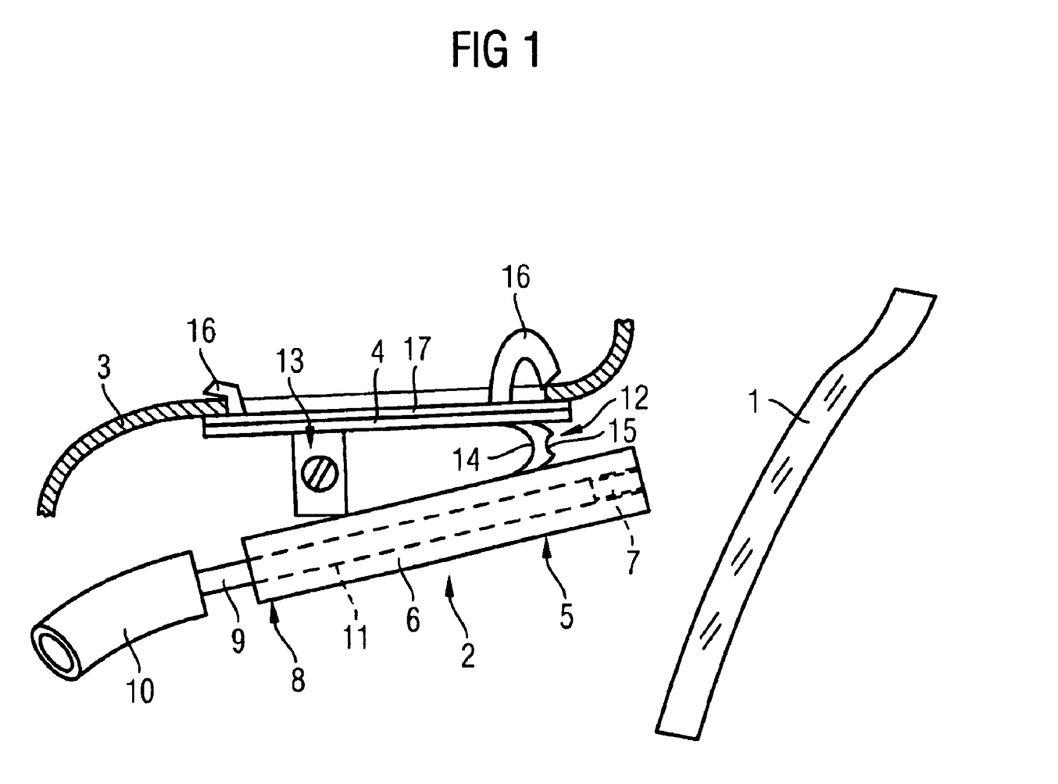
FIG. 1 shows, schematically, a windshield washer device fastened in a motor vehicle.

FIG. 1 shows, schematically, a windshield washer device 2, which is arranged in front of a windshield 1 in a motor vehicle, with a fastening flange 4 fastened in a body sheet 3. The windshield washer device 2 has a washer nozzle 7, which is directed at the windshield 1 and is arranged in a first section 5 of a nozzle holder 6. A second section 8, which is arranged at the end facing away from the washer nozzle 7, has a connection 9 for a washer fluid line 10. The two sections 5, 8 are connected to each other via a washer fluid channel 11. Washer fluid which is conveyed through the washer fluid line 10 to the nozzle holder 6 can therefore be guided to the washer nozzle 7 and passes from there onto the windshield 1. The nozzle holder 6 is connected to the fastening flange 4 via a spring element 12. Furthermore, the nozzle holder 6 is coupled to the fastening flange 4 via an adjusting means 13 at a distance from the spring element 12. Adjustment of the adjusting means 13 makes it possible to vary the distance of the nozzle holder 6 from the fastening flange 4 at this location and therefore to adjust the angle of inclination of the washer nozzle 7. The spring element 12 is formed as a connecting element 14, which is manufactured as a single piece with the nozzle holder 6 and the fastening flange 4, and has a cross-sectional tapering 15. The fastening flange 4 has latching elements 16 for connection to the body sheet 3. The latching elements 16 prestress the fastening flange 4 against the body sheet 3. Furthermore, a seal 17 arranged between the fastening flange 4 and the body sheet 3 is clamped in place by this means. The reference numbers of the components have been retained for the embodiments illustrated in FIGS. 2 to 5, and therefore corresponding components in the embodiments are identified with the same reference numbers.

Figure 2:
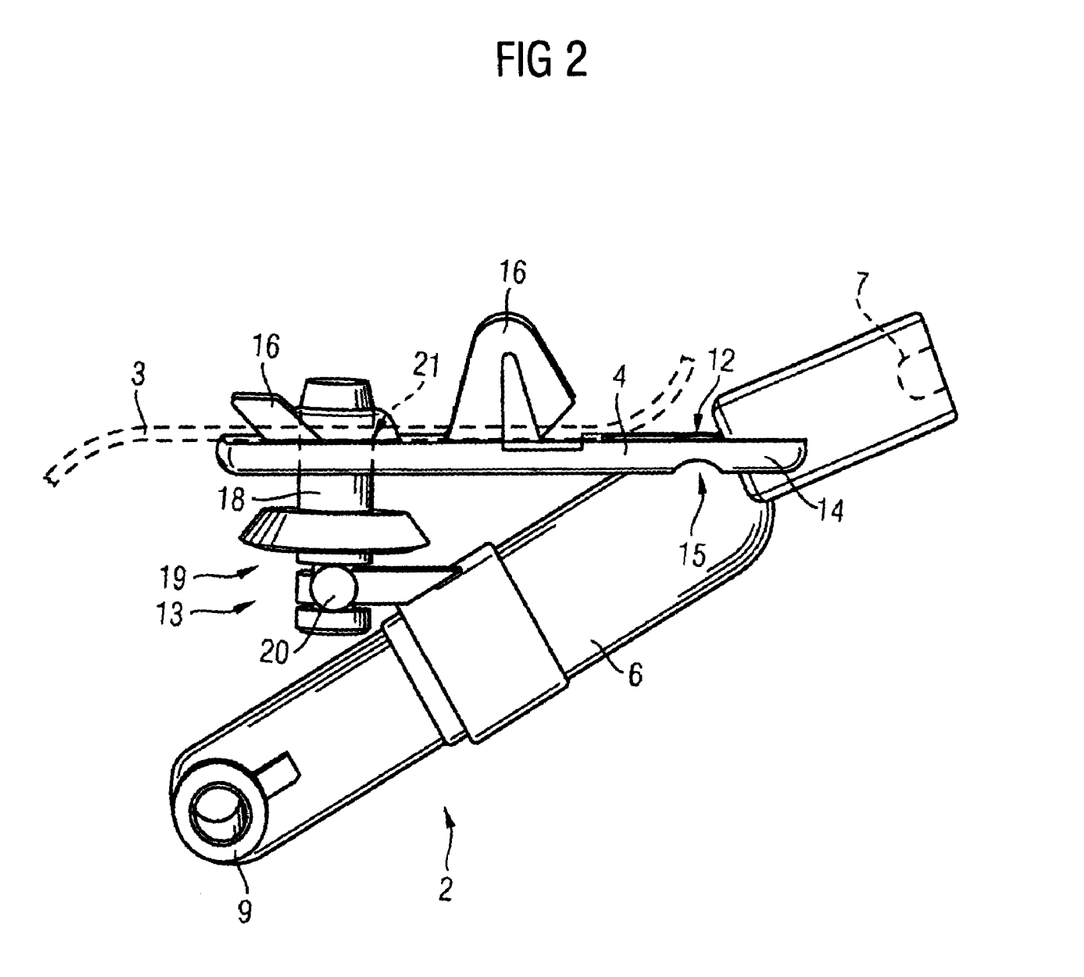
FIG. 2 shows an embodiment of the windshield washer device with a screw for adjusting the inclination.

FIG. 2 shows, perspectively, an embodiment of the windshield washer device 2 from FIG. 1, in which the adjusting means 13 has an adjusting screw 18 as adjusting element 19. The adjusting screw 18 is coupled to the nozzle holder 6 via a joint 20 and is screwed into a thread 21 on the fastening flange 4. Rotation of the adjusting screw 18 enables the angle of inclination of the washer nozzle 6 to be adjusted.

Figure 3:
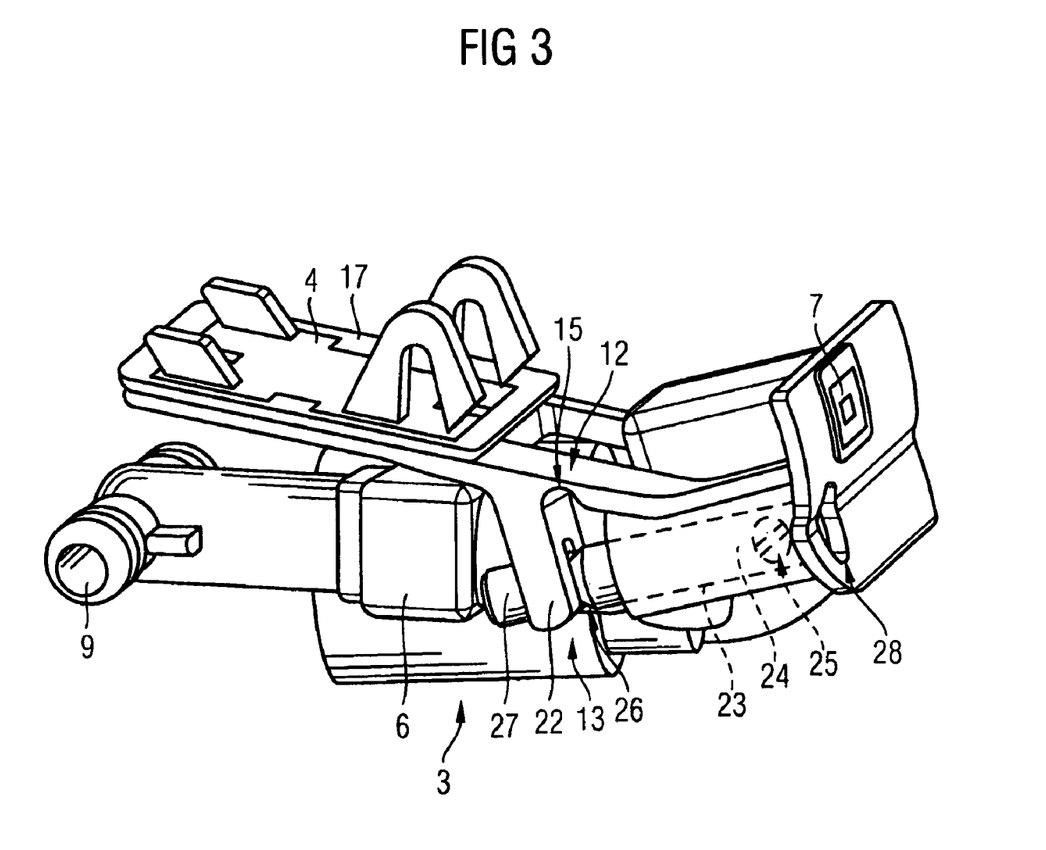
FIG. 3 shows a further embodiment of the windshield washer device with a screw for adjusting the inclination.

FIG. 3 shows, perspectively, a further embodiment of the windshield washer device 3 from FIG. 1, in which the adjusting means 13 has a connecting element 22 arranged on the fastening flange 4. An adjusting screw 24, which is screwed into a thread 23 of the nozzle holder 6 and is intended as adjusting element 25, is supported on the connecting element 22. The adjusting screw 24 is formed as a stud and has a constriction 26 in the region of the connecting element 22. The free end 27 of the adjusting screw 24, which end faces away from the thread 23 of the nozzle holder 6, engages behind the connecting element 22. The angle of inclination of the washer nozzle 7 can therefore be adjusted by optional rotation of the adjusting screw 24 in one or other direction. An opening 28 for the insertion of a screwdriver (not illustrated) for rotating the adjusting screw 24 is arranged next to the washer nozzle 7. The angle of inclination of the washer nozzle 7 can therefore be adjusted from the side of the washer nozzle 7.

Figure 4:
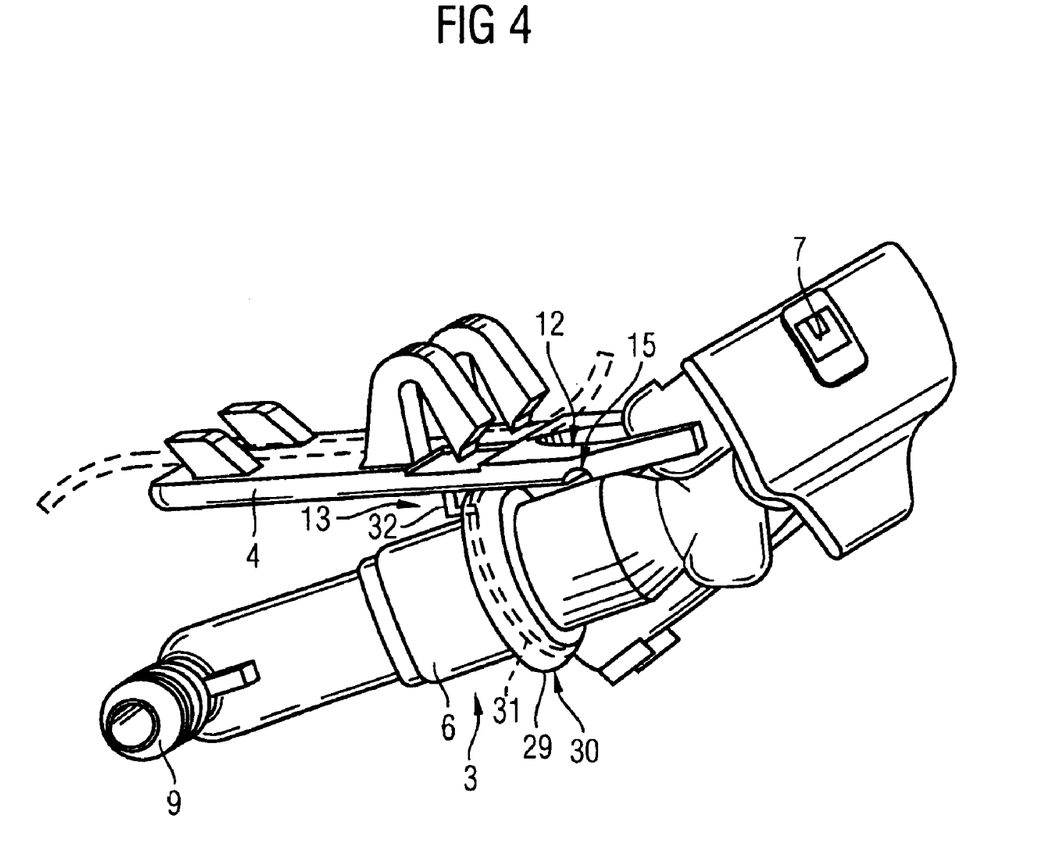
FIG. 4 shows a further embodiment of the windshield washer device with an eccentric for adjusting the inclination.

FIG. 4 shows a further embodiment of the windshield washer device 2 from FIG. 1. The adjusting means 13 in this embodiment has, as adjusting element 30, an annular eccentric 29 which surrounds the nozzle holder 6. A dog 32 arranged on the fastening flange 4 penetrates a groove 31 of the eccentric 29. Rotation of the annular eccentric 29 causes the dog 32 to slide in the groove 31, as a result of which the angle of inclination of the washer nozzle 7 can likewise be adjusted.

Figure 5:
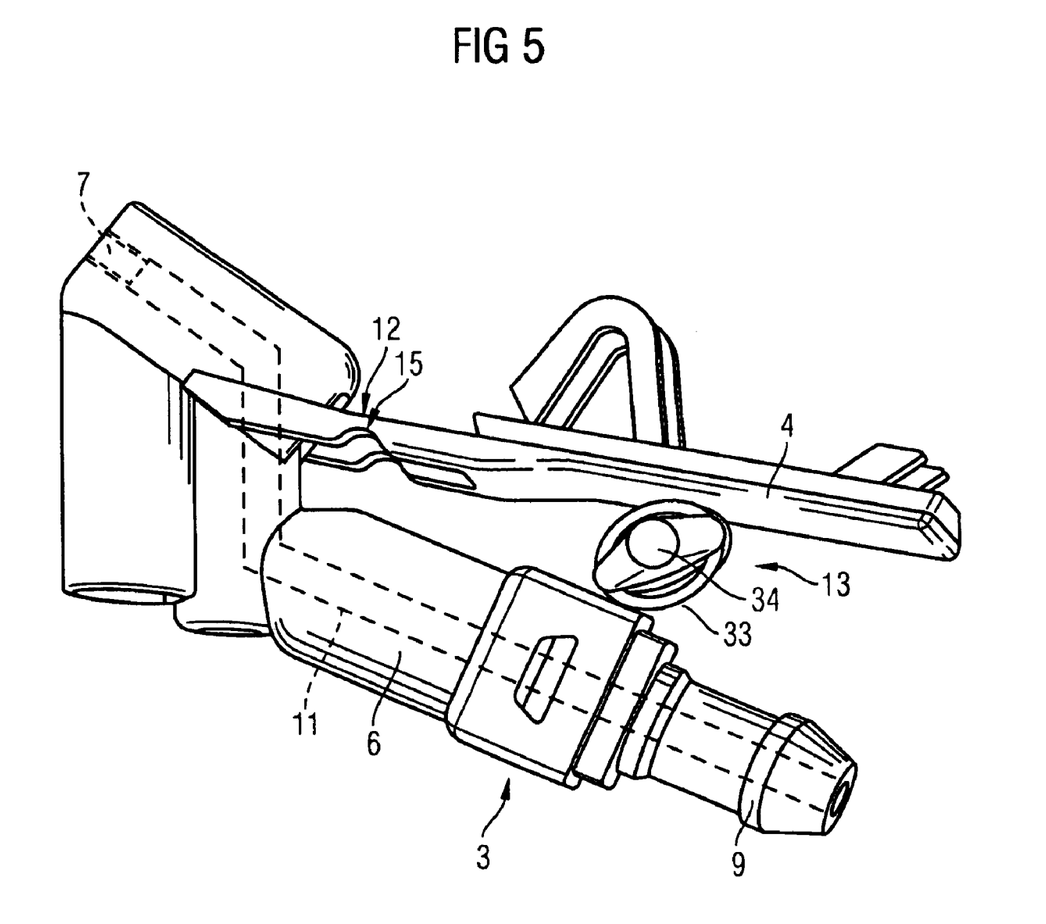
FIG. 5 shows a further embodiment of the windshield washer device with a ring element between a nozzle holder and a fastening flange.

FIG. 5 shows a further embodiment of the windshield washer device 2 from FIG. 1, in which the nozzle holder 6 is connected to the fastening flange 4 via a ring element 33 at a distance from the spring element 12. The ring element 33 is configured elastically. An adjusting element 34 of the adjusting means 13 is held frictionally in the ring element 33 and is configured to be oval. Rotation of the adjusting element 34 causes the ring element 33 to deform and therefore the angle of inclination of the washer nozzle 7 to be adjusted.

Figure 6:
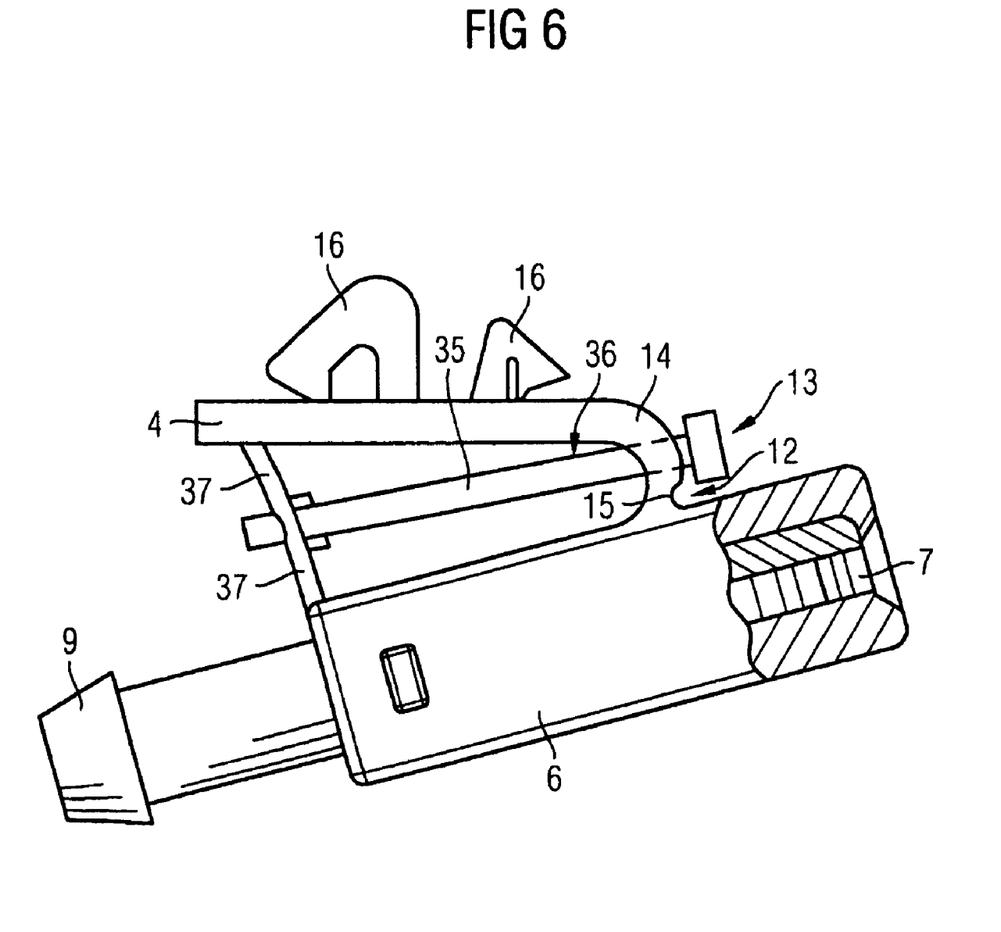
FIG. 6 shows a further embodiment of the windshield washer device with adjusting connecting elements.

FIG. 6 shows a further embodiment of the windshield washer device from FIG. 1, in which the nozzle holder 6 is connected to the fastening flange 4 via two deformable adjusting connecting elements 37 at a distance from the spring element 12. An adjusting element 36 formed as an adjusting screw 35 is supported on the fastening flange 4. Rotation of the adjusting screw 35 causes the adjusting connecting elements 37 to be deformed or bent and a nut 38 arranged between the adjusting connecting elements 37 to be moved in the longitudinal direction of the adjusting screw 35. The angle of inclination of the nozzle holder 6 in relation to the fastening flange 4 is therefore likewise adjusted.

What is claimed is:

1. A windshield washer device for a windshield washer system, comprising:
 a fastening flange provided for fastening in a motor vehicle,
 a nozzle holder having two sections, wherein a washer nozzle is arranged on one section of the nozzle holder and a connection for a washer fluid line is arranged in the second section of the nozzle holder, and
 an adjusting means, which has an adjustable adjusting element, for adjustment of the angle of inclination of the washer nozzle, wherein the adjusting means is coupled directly to the nozzle holder and coupled directly to the fastening flange at a first location on the fastening flange, and wherein the nozzle holder, which has the connection for the washer fluid line and the washer nozzle, is connected to the fastening flange via a spring element at a second location on the fastening flange spaced apart from the first location.

2. The windshield washer device according to claim 1, wherein the spring element is manufactured from the same material as the fastening flange and the nozzle holder.

3. The windshield washer device according to claim 1, wherein the nozzle holder, the fastening flange and the spring element are manufactured as a single piece from plastic by injection molding.

4. The windshield washer device according to claim 1, wherein the nozzle holder and the fastening flange are connected to each other via a connecting element, and wherein the spring element is formed as a cross-sectional tapering of the connecting element.

5. The windshield washer device according to claim 1, wherein the fastening flange is manufactured as a single piece with latching elements for interlocking and immovable fastening to the motor vehicle.

6. The windshield washer device according to claim 1, wherein the adjusting means has a joint arranged on the fastening flange or the nozzle holder.

7. The windshield washer device according to claim 1, wherein the adjusting means has a connecting element, which is arranged on the fastening flange or the nozzle holder, for supporting the adjusting element which is mounted on the respectively opposite component of the fastening flange or of the nozzle holder.

8. The windshield washer device according to claim 1, wherein a ring element, which is connected to the fastening flange and the nozzle holder and is configured elastically, or deformable adjusting connecting elements is or are arranged at a distance from the spring element.

9. The windshield washer device according to claim 1, wherein the adjusting element is formed as an adjusting screw.

10. The windshield washer device according to claim 1, wherein the adjusting element is formed as an eccentric.

11. The windshield washer device according to claim 1, wherein the adjusting element is arranged in the ring element and has a noncircular cross section.

12. The windshield washer device according to claim 1, wherein the nozzle holder has an opening for the passage of a tool to the adjusting element.

13. A windshield washer device for a windshield washer system, comprising:
 a fastening flange,
 a nozzle piece being connected to the fastening flange at a first location on the fastening flange via a spring element and having two sections, wherein a washer nozzle is arranged on one section of the nozzle piece and a connection for a washer fluid line is arranged in the second section of the nozzle piece, and
 an adjusting means coupled directly to the nozzle holder and the fastening flange at a second location on the fastening flange spaced apart from the first location, and having an adjustable adjusting element for adjustment of the angle of inclination of the washer nozzle.

14. The windshield washer device according to claim 13, wherein the spring element is manufactured from the same material as the fastening flange and the nozzle holder.

15. The windshield washer device according to claim 13, wherein the nozzle holder, the fastening flange and the spring element are manufactured as a single piece from plastic by injection molding.

16. The windshield washer device according to claim 13, wherein the nozzle holder and the fastening flange are connected to each other via a connecting element, and wherein the spring element is formed as a cross-sectional tapering of the connecting element.

17. The windshield washer device according to claim 13, wherein the fastening flange is manufactured as a single piece with latching elements for interlocking and immovable fastening to the motor vehicle.

18. The windshield washer device according to claim 13, wherein the adjusting means has a joint arranged on the fastening flange or the nozzle holder.

19. The windshield washer device according to claim 13, wherein the adjusting means has a connecting element, which is arranged on the fastening flange or the nozzle holder, for supporting the adjusting element which is mounted on the respectively opposite component of the fastening flange or of the nozzle holder.

20. The windshield washer device according to claim 13, wherein a ring element, which is connected to the fastening flange and the nozzle holder and is configured elastically, or deformable adjusting connecting elements is or are arranged at a distance from the spring element.

* * * * *